Feb. 22, 1944.   L. W. BIRCH   2,342,242
CONDUCTOR SUPPORT
Filed Nov. 11, 1942
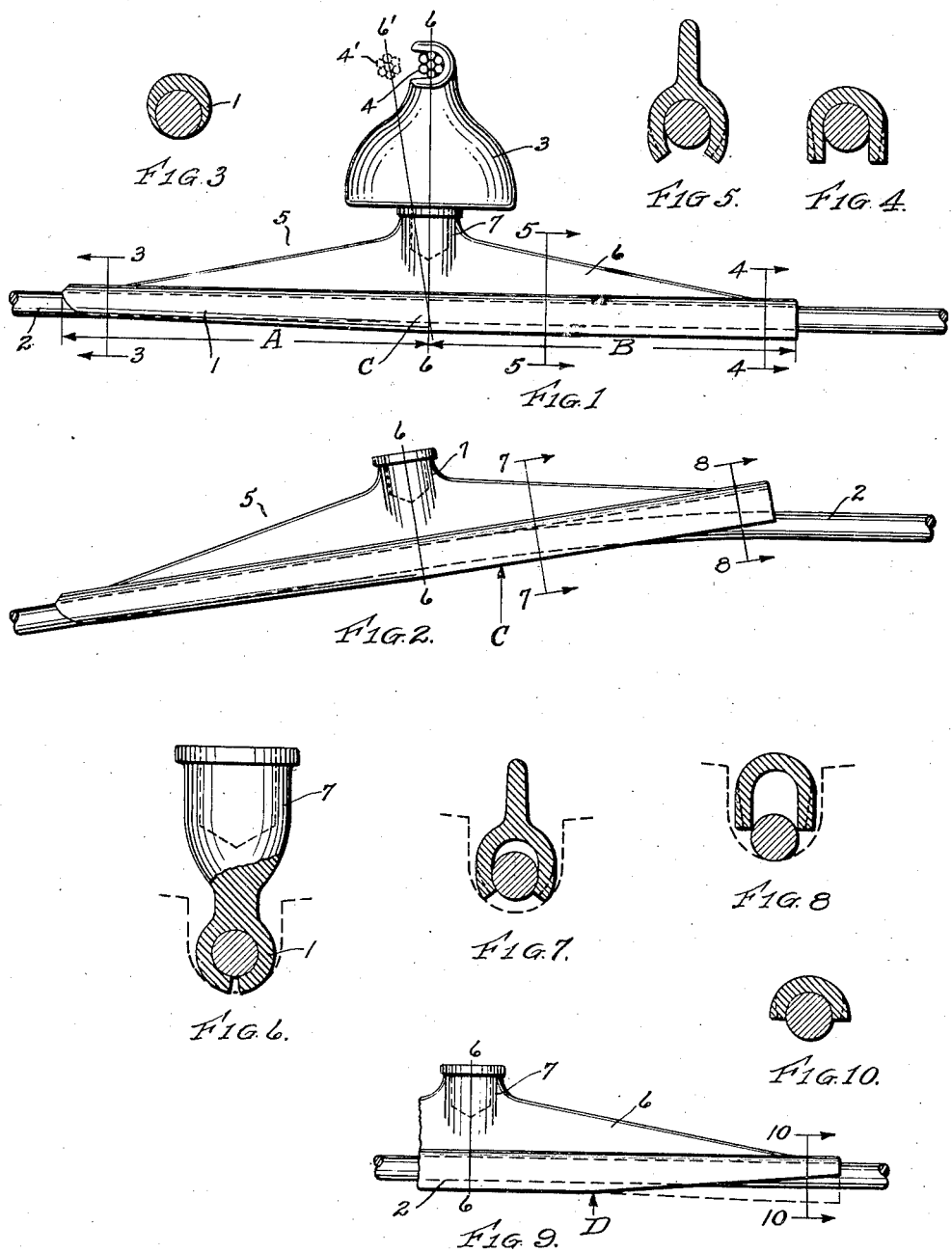
Inventor
LELAND W. BIRCH
By
Attorney

Patented Feb. 22, 1944

2,342,242

UNITED STATES PATENT OFFICE 2,342,242

CONDUCTOR SUPPORT

Leland W. Birch, Mansfield, Ohio, assignor to The Ohio Brass Company, Mansfield, Ohio, a corporation of New Jersey Application November 11, 1942, Serial No. 465,283

9 Claims. (Cl. 191—43)

My invention relates to trolley ears or supports for supporting a trolley wire or other conductors from an over-head support and has particular reference to ears of the clinch type for round wire in which the lips are formed about the wire or conductor.

One object of my invention is to provide an ear which will permit a smooth passage of a current collector from the wire onto the ear, then across the ear or a portion thereof, and from there a continued smooth passage from the ear onto the trolley wire before the current collector passes beyond the ear.

Another object of my invention is to provide an ear in which the current collector will pass smoothly from the approach half of the ear into contact with the trolley wire before the collector has passed entirely beyond the leaving end of the ear.

Another object of my invention is to provide an ear in which the trolley wire is not clinched onto the ear at the leaving end, but is free to move relative to the end of the ear in a vertical plane as the current collector passes along the ear.

Due to the increased difficulty of securing copper trolley wire and to the increasing cost of installation labor a more critical attitude is being taken by operators of trolley lines with respect to wear upon the trolley wire especially just beyond the leaving end of the ear by the current collector, and with respect to other damage to the wire.

With many ears of the clinch type for round wire now upon the market, there is a tendency for the collector to give a slight jump from the leaving end of the ear onto the wire. When a collector of the glider or shoe type is used the leading end of the shoe has a tendency to tip up and give the trolley wire a slight blow just beyond the leaving end of the ear.

This is due to the collector making a too abrupt passage from the leaving end of the ear onto the wire, which in turn depends upon the formation of the lips relative to the trolley wire.

If the leading end of the current collector is prevented from tilting upward and striking the trolley wire prior to the collector leaving the end, injuries to the trolley wire will be avoided or greatly reduced.

I have, therefore, provided an ear of the clinch type for round wire in which the leading end of the current collector passes smoothly from contact with the lips of the ear onto the trolley wire and is thus prevented from striking the trolley wire, thereby avoiding or greatly reducing the possibility of injury to the trolley wire. If the entire length of the contact surface of the current collector could at the same instant engage the wire just after passing the ear, the greater length of contact area engaging the trolley wire would greatly reduce the present wear thereon.

My invention resides in the new and useful construction, relation and formation of the various parts of the ear and especially the lips as described in this specification and shown in the accompanying drawing.

In the drawing:

Fig. 1 is a side view of my invention shown as applied to a trolley wire.

Fig. 2 is a side view of Fig. 1 just after the current collector has passed the longitudinal center of the ear or just beyond the supporting point.

Figs. 3 to 8, inclusive, are enlarged sections on corresponding lines of Figs. 1 and 2.

Fig. 9 is a modification of the leaving half of the ear shown in Fig. 1.

Fig. 10 is a section on the line 10—10 of Fig. 9.

In the preferred embodiment of my invention the approach half A is of the usual construction applied to a clinch ear for round wire, since there is no damage to the trolley wire in advance of the approach end of the ear. The leaving half B, however, is different from the present standards and functions differently in combination with a trolley wire.

Referring to Figs. 1, 3, and 6 it will be noted that the lips are tapered in both thickness and depth from a maximum at line 6—6 to a minimum at the approach end of the ear. When the lips are clinched about the wire the current collector may pass from the trolley wire onto the ear in a relatively smooth manner. If the passage is not entirely smooth no harm is done to the trolley wire as any roughness of passage is taken up by the lips of the ear. This taper of the lips may be for only ½ of A or even less.

From line 6—6 to the leaving end of the ear the lips of portion B may be of substantially the thickness and depth of the lips at line 6—6 or in other words at the meeting of the portions A and B as shown in Figs. 1, 4, and 6, and the lips of this portion are not clinched in the usual manner onto the wire.

It is of course necessary to gradually adjust or reduce the clinching of the lips onto the wire from the line 6—6 to a point just beyond so that the passage of the current collector from A to B will not be abrupt. This clinching is readily done by the linemen at the time of installation of the ear. The effect of this clinching is shown by comparing Figs. 4 and 6 with Fig. 5, the latter showing only a partial clinch.

It will be noted that if a current collector were to pass along the ear rigidly supported in the position shown in Fig. 1 that when the collector reached the leaving end of the ear there would be a decided jump from the ear onto the wire. However, when the wire is supported by an overhead hanger from the cross-span 4 as is the usual construction, the ear and trolley wire are lifted and the ear pivoted as for instance about the point C and the span 4 moves to the portion 4'.

It is evident that when a current collector engages the approach end of the ear there will be an upward tilting of the ear and the wire due to the upward pressure of the trolley wire but such action will be simultaneous and equal and the relationship of the wire to the ear will not change as the portion A is clinched onto the trolley wire but as the collector approaches the longitudinal center of the ear the canting will be reduced and the ear will "level off" when the collector reaches the longitudinal center, but the leaving end will be raised after the collector passes the longitudinal center.

The amount of canting will depend upon a number of factors as for instance, length of ear, tightness to which the trolley wire has been strung, amount of upward pressure of the current collector and tightness to which the span wire has been drawn.

After the current collector passes the longitudinal center, the ear 5 the wire 2 assume a different relationship along portion B as shown in Fig. 2 due to the lips 1, not being clinched, but free to move vertically relative to wire 2.

It will be noted in Fig. 2 the leaving end of the ear has raised above the trolley wire and the lower or contact surface of the wire is exposed and projecting below the lower edge of the lips and that the relationship between the wire and ear is such that the collector will pass smoothly from its contact with the lower edge of the lips onto the contact surface of the wire.

The formation of the lips 2 on portion B of the ear may be made to effect a contact between a current collector of the glider type and the trolley wire for the full length of the collector at the same time.

If it is desired to provide the lips of portion B so that they are better adapted to fit a collector with a narrowed groove as sometimes occurs with a glide collector using a carbon insert, the lips of portion B may be tapered as shown by the dotted lines in Figs. 4, 5, 7, and 8.

In such case it is desirable to begin the taper of the lips in portion B as shown by the dotted lines, at the inner end of portion A and make the taper graduate to its maximum at approximately the line 7—7. This tapering of the lips of portion B will not affect the relationship between the ear and wire or change the functioning thereof.

It will be noted from section 5—5 where the lips are partially clinched onto the wire that the wire rests in the upper part of the bight of the groove and that it is still possible for relative vertical movement by the wire and ear. When this vertical movement takes place then the wire rests in the lower part of the groove as shown in Fig. 7, and at the leaving end of the ear where there is no clinching as shown in Fig. 4, the wire is free to move relative to the groove until its lower contact surface is exposed as shown in Fig. 2. The current collector in passing along the section B and will gradually engage with the trolley wire and if the collector is of the shoe type the leading end will first engage the lower edge of the lips of the section B and then gradually ride onto the trolley wire engaging both the lips and the wire and then gradually the entire length of the shoe will pass onto the trolley wire without injury thereto.

A further modification from that shown in Figs. 1 to 8, inclusive, is shown in Figs. 9 and 10 in which the depth of the lips varies gradually from the point D to the leaving end of the ear. This modification would find use under conditions where the movement of the ear relative to the wire was not sufficient to secure the necessary gradual engagement of the collector with the wire or where there was no relative movement of the wire and end of the ear.

If desired to meet still other conditions, the lips of portion B may be tapered as shown by the dotted line in Fig. 9 in which case the groove will be deeper at the leaving end of the ear than nearer the longitudinal center.

The lips are supported by web 6 and the web is provided with a threaded boss 7 attached to hanger 3.

Modifications from my disclosures may suggest themselves to those skilled in the art but I wish to be limited only by my claims. If desired, the portion A may be made somewhat less than portion B to give more gradual change in the leaving end of the ear. In that case it will probably be advisable to move the boss 7 in line with the new junction of portions A and B.

It will be apparent that this ear is of a unidirectional type which must be installed on the wire with reference to the direction of travel of the current collector.

I claim:

1. A trolley wire support operable in one direction comprising a body member and a boss member united, a pair of spaced and bendable lips depending from the body and forming a longitudinal groove for the trolley wire, the support formed of two longitudinal portions, one portion to receive an approaching current collector and the other portion to guide a collector onto the trolley wire along the leaving portion of the support, the lips of the first said portion adapted to be bent onto the trolley wire to hold the same in a predetermined position and to smoothly guide the current collector onto the wire and to protect the trolley wire, the depending lips of the leaving portion arranged to form an open groove when the trolley wire is positioned therein of greater depth than the diameter of the trolley wire, and to permit the trolley wire and the leaving portion to move vertically relative to each other at the passing of the current collector sufficiently for the lower surface of the trolley wire to contact the current collector, whereby the current collector may pass smoothly from the approach portion of the support and into contact with the trolley wire before the current collector has passed beyond the leaving end of the ear.

2. A support for a trolley wire comprising a body member and a support member forming a unit, a pair of spaced and bendable lips projecting from the body and forming a longitudinal groove to receive the trolley wire, the lips forming two portions, one portion in which the lips are adapted to be former onto the wire to hold the wire within the groove of said one portion and to guide a current collector smoothly onto the support from the trolley wire after said forming of the lips, the lips of the other portion arranged to form an open groove of greater depth than the diameter of the trolley wire for the trolley wire and to form a guide along the lower edge of the lips for the current collector whereby it may pass smoothly from the said one portion into contact with the trolley wire before the collector has passed entirely beyond the leaving end of the support.

3. In combination, a trolley wire, an elongated support for the trolley wire, the support comprising a body member and a support member forming a unit, the body member provided with projecting bendable lips forming an elongated groove for the trolley wire, the lips arranged in two portions namely an approach portion and a leaving portion, the lips of the approach portion being tapered from a maximum thickness and depth at the longitudinal center of the body to a minimum at or adjacent the other end of the approach portion and being bent onto the trolley wire and forming a means of securing the support to the wire and also forming a guide for a grooved current collector from the wire onto the support, the lips of the leaving portion being of maximum depth and thickness throughout the length of the leaving portion and forming an open bottom groove whereby the trolley wire and the support are free to move relative to each other in a vertical plane and within the length of the leaving portion, whereby the current collector will contact the free edges of the lips and the trolley wire simultaneously in passing from the ear onto the trolley wire.

4. In combination a trolley wire support and a trolley wire, the support comprising a web portion and a boss portion united, a pair of depending lips from the web portion forming an elongated groove to receive the trolley wire, the lips arranged in two longitudinal portions, an approach portion and a leaving portion, the lips of the approach portion tapering in depth and thickness to a maximum at the junction of the said portions and formed onto the wire whereby a grooved current collector may pass smoothly from the trolley wire onto the approach portion of the support and contacting the outer faces of the lips, the lips of the leaving portion being of a maximum thickness throughout their length and forming an open bottom groove extending along the leaving portion of the support, whereby the trolley wire is free to move transversely relative to the support whereby the lower contact edge of the wire will project sufficiently below the lower edge of the lips of the leaving portion to be engaged by the current collector as it moves across the support in contact with the lower edge of the lips of the leaving portion.

5. A trolley wire support comprising in combination a body portion and a supporting portion forming a unit, a pair of spaced lips projecting from the body portion and forming a longitudinal groove to receive the trolley wire, the lips forming two continuous portions, namely an approach portion and a leaving portion, the lips of the approach portion being adapted to be bent onto the trolley wire and tapering in thickness and depth from a maximum at the junction of the said portions, the lips of the leaving portion being of maximum depth and thickness adapted to be unbent and to form an open bottom groove after the support is applied to the wire, whereby the wire and leaving portion of the ear may move relative to each other in said groove in the leaving portion at the passage of the current collector and permit the current collector to pass smoothly along the lips of the leaving portion and into gradual engagement with the contact surface of the wire.

6. A trolley wire support comprising an elongated body portion and a support portion united to form a unit, a pair of lips depending from the body portion and forming a longitudinal groove for the trolley wire, the groove forming two portions, the lips of one portion adapted to be clinched onto the wire and protect the wire from contact with a current collector and the lips of the other portion adapted to be unclinched and form an open bottom groove with depending lips whereby a grooved current collector may pass from the said one portion onto the said other portion and into engagement with the trolley wire prior to any portion of the collector passing beyond the end of said other portion, whereby the passage of the collector along the said other portion will be in contact with both the lower edges of the lips and the lower surface of the trolley wire at the same time, insuring the passage of the current collector onto the trolley wire will be smooth and uninterrupted.

7. In combination, a trolley wire, an elongated support for the wire, the support comprising a body portion and a holding portion forming a unit, the body portion provided with projecting lips forming an elongated groove in which the trolley wire rests, a portion of the lips formed onto the wire, the other portion of the lips left unformed and providing an open bottom groove for the trolley wire whereby the wire is free to move in said groove upon the upward pressure of a passing current collector upon the edges of the lips and the contact surface of the wire will be gradually brought into engagement with the passing collector through the said movement of the trolley wire in said open bottom groove.

8. In combination, a trolley wire and a trolley wire support, the support comprising an elongated body portion provided with support means therefor, the body portion provided with lips forming an elongated groove in which the trolley wire is positioned, a portion of the lips being formed onto the wire to secure them together against relative movement and to protect said portion, the other portion of the lips forming an open bottom groove in which the wire is vertically movable, the lips forming the open bottom groove being of such depth that when the support is tipped from its normal position by the upward pressure of the current collector upon the lower edge of the lips the trolley wire will contact with the current collector as it passes along the support.

9. In a trolley system wherein a trolley wire is suspended by a uni-directional support, the support having depending lips at one end forming a groove for the trolley wire and the lips thereof peened about the wire to secure the support to the wire and to protect the wire from contact with the passing current collector, the combination with the support of depending lips at the other end thereof, longitudinally continuous with the first said lips and connected by a bight conforming to the shape and size of the trolley wire and forming an open bottom groove of greater depth than the diameter of the trolley wire and in which the trolley wire rests with freedom to move vertically in the groove relative to the support whereby the upward pressure of the current collector passing the support in engagement with the lower edge of the lips of the open groove will raise the support relative to the trolley wire thus bringing the current collector into contact with the trolley wire while still contacting the lips.

LELAND W. BIRCH.